United States Patent [19]

Mittelhäuser

[11] Patent Number: 4,883,349
[45] Date of Patent: Nov. 28, 1989

[54] REAR VIEW MIRROR FOR MOTOR VEHICLES

[76] Inventor: Bernhard Mittelhäuser, Am Krähenberg, 3002 Wedemark 2, Fed. Rep. of Germany

[21] Appl. No.: 248,491

[22] Filed: Sep. 23, 1988

[30] Foreign Application Priority Data

Oct. 10, 1987 [DE] Fed. Rep. of Germany ....... 3734393

[51] Int. Cl.⁴ .......................... G02B 7/18; G02B 5/08; B60R 1/06
[52] U.S. Cl. .................................. 350/631; 248/475.1; 248/900; 350/632
[58] Field of Search ...................... 248/475.1, 495, 496, 248/900, 479, 481, 483; 350/631, 632, 639, 634, 636, 637

[56] References Cited

U.S. PATENT DOCUMENTS

| | | | |
|---|---|---|---|
| 2,836,818 | 5/1958 | Virgilis | 350/631 |
| 2,895,380 | 7/1959 | Kurlytis | 350/639 |
| 3,188,913 | 6/1965 | O'Shei | 248/475.1 |
| 3,515,365 | 6/1970 | Jones et al. | 350/631 |
| 4,380,370 | 4/1983 | Mittelhauser | 350/632 |
| 4,514,060 | 4/1985 | Mittelhauser | 350/632 |
| 4,640,142 | 2/1987 | Cummins et al. | 350/632 |
| 4,711,421 | 12/1987 | Mittelhauser | 350/632 |
| 4,768,871 | 9/1988 | Mittelhauser et al. | 350/632 |

Primary Examiner—Bruce Y. Arnold
Assistant Examiner—Martin Lerner
Attorney, Agent, or Firm—Becker & Becker, Inc.

[57] ABSTRACT

A rear view mirror for a motor vehicle. An anchoring member is fixedly mounted on the vehicle, and that part of the mirror that is provided with a mirror body is adapted to be connected to the anchoring member by being pressed or otherwise placed thereon. In order to be able to establish an electrical connection during mounting of the mirror, the anchoring member and the part placed thereon are provided with electrical contacts, whereby when the mirror body part is placed on the anchoring member, a contact connection is established between these two components.

10 Claims, 1 Drawing Sheet

REAR VIEW MIRROR FOR MOTOR VEHICLES

BACKGROUND OF THE INVENTION

The present invention relates to a rear view mirror for a motor vehicle, especially to an inside mirror, with the mirror including a part that is provided with a mirror body, and a securing or anchoring member that is fixedly mounted on the vehicle; that part of the mirror that is provided with the mirror body is adapted to be connected to the anchoring member by being pressed or otherwise placed thereon. The mirror is provided with an electrical connection, for example for operating a light disposed at the front free end of the mirror.

With heretofore known mirrors of this general type, when the forward portion of the mirror is placed or mounted on the anchoring member, the electrical connection must be established by special mechanisms, for which individual contact elements are provided that must be actuated.

It is therefore an object of the present invention to improve a mirror of the aforementioned general type in such a way that the electrical connection thereof can be established without any further mechanisms, in other words, without special manipulations or the like, when the forward portion of the mirror is placed or pressed upon the anchoring member.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
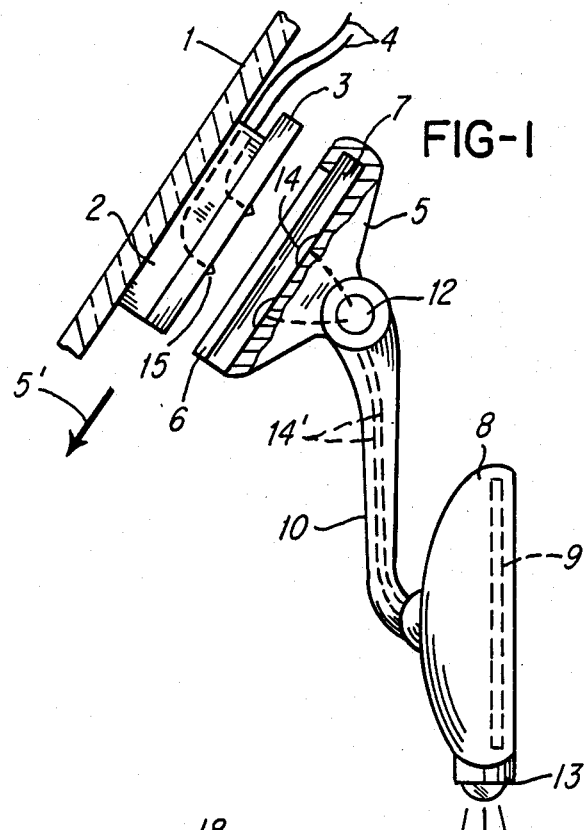
FIG. 1 is a partially sectioned side view of one exemplary embodiment of the inventive inside rear view mirror for a passenger car.

The rear view mirror of the present invention is characterized primarily in that the anchoring member and that part of the mirror that is provided with the mirror body are provided on facing portions with electrical contacts, whereby when the aforementioned part is placed on the anchoring member, a contact connection is established between these two components.

These contacts are expediently embodied in such a way that with each two cooperating contacts, at least one is resiliently yieldingly mounted in order on the one hand to be able to carry out a placement or pressing of the aforementioned part upon the anchoring member, and on the other hand to nevertheless allow a reliable contact to be established.

A mirror embodied pursuant to the present invention has the advantage that assembly or disassembly of the mirror can be effected without regard to the electrical connections, and this can be accomplished without any particular accuracy and without tools.

It is also within the scope of the present invention to provide several contact pairs, especially more than two contact pairs, so that in conformity therewith a number of electrical lines can readily be connected.

The inventive contacts are normally provided on the one hand on the anchoring member and on the other hand on an arm or similar carrier for the mirror housing by being integrated into these elements or components, and in particular in such a way that they do not project therefrom, but rather are as flat as possible, and are even recessed.

Further specific features of the present invention will be described in detail subsequently.

DESCRIPTION OF PREFERRED EMBODIMENTS

Referring now to the drawing in detail, an approximately plate-shaped securing or anchoring member 2 is secured to the inside of the front window or windshield 1 of a vehicle by adhesion or the like. The anchoring member 2 is provided with a rim 3, which projects upwardly and to the sides, as well as with leads 4 that are connected to the source of current for the vehicle. A base 5 can be pressed or placed upon the anchoring member 2 in the direction of the arrow 5'. In order to achieve a reliable, positive connection, the base 5 is provided with a recessed portion 6, including an undercut 7 that corresponds to the shape of the rim 3. When the base 5 is placed upon the anchoring member 2, a reliable yet detachable connection exists between the base 5 and the anchoring member 2.

The arm 10, which via a ball-and-socket joint 11 holds the mirror housing 8, in which is disposed the mirror body 9, is connected to the base 5 via a joint 12.

Disposed at the bottom of the mirror housing 8 is a light 13, the bulb of which must be supplied with current. For this purpose, electrical leads 14' extend within the mirror housing 8, the arm 10, and the base 5, where the leads are connected to two contacts 14 disposed on the base of the recessed portion 6.

Associated with the contacts 14 are contacts 15 that are disposed above on the anchoring member 2. When the base 5 is placed upon the anchoring member 2 and the mirror is in the operative position, the contacts 14, 15 contact one another, so that the lamp 13 can be operated.

Therefore, the current connection is ensured by the contacts 14, 15 when the mirror is mounted. The supply of current is interrupted when the base 5 is removed from the anchoring member 2. These connections are established or interrupted without any additional measures having to be undertaken.

Figure 2:
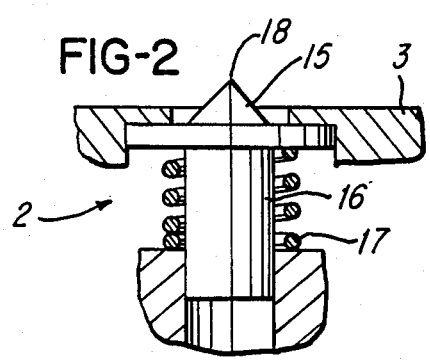
FIG. 2 is a partial cross-sectional view through the anchoring member of the mirror of FIG. 1.

The important thing is that the contact connection be reliably established and remain intact even when vibrations are encountered. For this purpose, as best shown in FIG. 2, the contact 15 is disposed at the forward, free end of a push rod or pin 16 that can shift to the rear in the axial direction against the effect of a compression spring 17. When the base 5 is placed upon the anchoring member 2, the contacts 15 are pressed in slightly; after assembly or mounting is completed, the compression spring 17 assures a close contact connection between the contacts 14, 15 of the two contact pairs. In this connection, it is particularly advantageous if the contacts 15 respectively terminate in a point 18.

The resiliently yielding mounting of the contacts 15, and possibly also of the contacts 14, could also be achieved via a leaf-type spring, with the contact elements being disposed, for example, on the free end of the spring.

The resilient construction of the contacts also has the great advantage that it leads to a frictional connection between the anchoring member 2 and the base 5. Thus, this connection is made even more reliable.

The present invention is, of course, in no way restricted to the specific disclosure of the specification and drawing, but also encompasses any modifications within the scope of the appended claims.

What I claim is:

1. A rear view mirror for a motor vehicle, comprising:
   an anchoring member that is fixedly mounted on said vehicle;
   a part that is provided with a mirror body and that is adapted to be connected to said anchoring member by being pressed or otherwise placed thereon;
   first electrical contact means disposed on said anchoring member and connected to a source of current; and
   second electrical contact means disposed on said part provided with said mirror body in such a way that when said part is placed on said anchoring member, said first and second electrical contact means cooperate with one another such that a contact connection is established between said first and second contact means and hence between said anchoring member and said part provided with said mirror body.

2. A rear view mirror according to claim 1, in which said first and second electrical contact means each comprise at least three contacts.

3. A rear view mirror according to claim 1, in which said first electrical contact means comprises at least two contacts that cooperate with a corresponding number of contacts of said second electrical contact means, whereby at least one contact of each pair of cooperating contacts is resiliently yieldingly mounted on its component in such a way that when said part provided with said mirror body is placed on said anchoring member, said contact connection is established by a restoring force that acts on said at least one contact.

4. A rear view mirror according to claim 3, in which said restoring force is such that a frictional connection is achieved or increased between said anchoring member and said part provided with said mirror body.

5. A rear view mirror according to claim 3, in which each of said contacts has a free end that faces a free end of a cooperating contact, whereby the free end of at least one contact of each pair of cooperating contacts terminates in a point.

6. A rear view mirror according to claim 3, in which each of said contacts has a free end that faces a free end of a cooperating contact, whereby the free end of at least one contact of each pair of cooperating contacts terminates in a cone.

7. A rear view mirror according to claim 3, in which said resiliently yieldingly mounted contacts are disposed on said anchoring member.

8. A rear view mirror according to claim 3, which includes spring-loaded pin means on at least one of said anchoring member and said part provided with said mirror body, with said contacts being disposed on said pin means to effect said resilient yielding mounting thereof.

9. A rear view mirror according to claim 3, which includes leaf-type spring means on at least one of said anchoring member and said part provided with said mirror body, with said contacts being disposed on said spring means to effect said resiliently yielding mounting thereof.

10. A rear view mirror according to claim 1, in which said part provided with said mirror body includes a mirror housing for said mirror body, with a light being disposed on a lower edge of said mirror housing, and with electrical leads being disposed in said part and in said mirror housing and leading from said second electrical contact means to said light.

* * * * *